(12) United States Patent
Mizuno (10) Patent No.: US 12,503,557 B2
(45) Date of Patent: Dec. 23, 2025

(54) THERMOPLASTIC ELASTOMER COMPOSITION, JOINT MEMBER, AND METHOD FOR PRODUCING THE SAME

(71) Applicant: MCPP Innovation LLC, Tokyo (JP)

(72) Inventor: Tadashi Mizuno, Tokyo (JP)

(73) Assignee: MCPP Innovation LLC, Tokyo (JP)

( * ) Notice: Subject to any disclaimer, the term of this patent is extended or adjusted under 35 U.S.C. 154(b) by 718 days.

(21) Appl. No.: 17/680,806

(22) Filed: Feb. 25, 2022

(65) Prior Publication Data

US 2022/0177654 A1 Jun. 9, 2022

Related U.S. Application Data

(63) Continuation of application No. PCT/JP2020/018794, filed on May 11, 2020.

(30) Foreign Application Priority Data

Aug. 26, 2019 (JP) .................................. 2019-153972

(51) Int. Cl.
*C08G 81/02* (2006.01)
*C08J 3/24* (2006.01)

(52) U.S. Cl.
CPC .............. *C08G 81/022* (2013.01); *C08J 3/24* (2013.01); *C08G 2190/00* (2013.01); *C08J 2353/02* (2013.01)

(58) Field of Classification Search
CPC ........ C08L 53/025; C08L 91/00; C08L 25/02; C08L 23/16; C08L 23/10; C08L 23/14; C08L 23/142; C08L 23/147; C08K 5/14
See application file for complete search history.

(56) References Cited

U.S. PATENT DOCUMENTS

2009/0155537 A1* 6/2009 Fuse ...................... C08J 9/0066
264/55
2010/0267899 A1* 10/2010 Nakano ................... C08L 23/10
525/194

(Continued)

FOREIGN PATENT DOCUMENTS

EP 3284785 A1 * 2/2018 .............. C08L 53/02
JP 2003-155386 A 5/2003

(Continued)

OTHER PUBLICATIONS

Office Action issued Mar. 23, 2024 for Chinese Patent Application No. 202080052657.6.

(Continued)

*Primary Examiner* — Mark S Kaucher
(74) *Attorney, Agent, or Firm* — Morgan, Lewis & Bockius LLP (57) ABSTRACT

A joint member having a thermoplastic elastomer composition including components (A), (B), and (C). Component (A): a hydrogenated product of a block copolymer including at least two polymer blocks composed primarily of a vinyl aromatic compound and at least one polymer block including butadiene, wherein, in the hydrogenated product of the block copolymer, a proportion of a hydrogenated product (A1) of a block copolymer having a weight-average molecular weight of 300,000 or more is 30% to 100% by mass, Component (B): a hydrocarbon rubber softener, Component (C): a polypropylene resin, Component (D): a crosslinking agent.

15 Claims, 1 Drawing Sheet

(56) References Cited

U.S. PATENT DOCUMENTS

| | | | |
|---|---|---|---|
| 2015/0274950 A1* | 10/2015 | Matsunaga | ............. C08L 23/16 525/240 |
| 2017/0029614 A1 | 2/2017 | Yagi et al. | |
| 2018/0334521 A1* | 11/2018 | Gruendken | ........... C08F 212/12 |

FOREIGN PATENT DOCUMENTS

| | | | |
|---|---|---|---|
| JP | 2008-266615 A | 11/2008 | |
| JP | 2011-080021 A | 4/2011 | |
| JP | 2016-113614 A | 6/2016 | |
| JP | 2016-196601 A | 11/2016 | |
| JP | 2017-057419 A | 3/2017 | |
| JP | 2019-131722 A | 8/2019 | |
| WO | 2016/031991 A1 | 3/2016 | |
| WO | 2018/213462 A1 | 11/2018 | |

OTHER PUBLICATIONS

Extended European Search Report issued in corresponding European Patent Application No. 20859590.0 dated Sep. 15, 2022.
Third Party Observation dated Jan. 2, 2024 for counterpart European Patent Application No. 20859590.0.
Office Action issued in corresponding Chinese Patent Application No. 202080052657.6 dated Sep. 7, 2023.
International Search Report issued in related International Patent Application No. PCT/JP2020/018794 dated Jul. 14, 2020.
Office Action issued in corresponding Japanese Patent Application No. 2019-153972 dated Nov. 8, 2022.
Office Action issued in corresponding Chinese Patent Application No. 202080052657.6 dated Feb. 25, 2023.

* cited by examiner

THERMOPLASTIC ELASTOMER COMPOSITION, JOINT MEMBER, AND METHOD FOR PRODUCING THE SAME

TECHNICAL FIELD

The present invention relates to a thermoplastic elastomer composition, a joint member that includes the thermoplastic elastomer composition, a method for producing the joint member, and an automotive composite molded body that includes the joint member. Specifically, the present invention relates to a thermoplastic elastomer composition that is excellent in terms of sliding performance, capability of fusion bonding to extrusion-molded members, and compression set (setting resistance) at high temperatures and that has flowability appropriate for injection molding, a joint member that includes the thermoplastic elastomer composition, a method for producing the joint member, and an automotive composite molded body that includes the joint member.

BACKGROUND ART

The production of a thermoplastic elastomer composition by dynamic heat treatment of a polypropylene resin and a styrene-butadiene block copolymer does not require a vulcanization step although the resulting thermoplastic elastomer composition has the properties of a rubber-like soft material. Furthermore, the thermoplastic elastomer composition has workability comparable to that of a thermoplastic resin. Therefore, attentions have been focused on such a thermoplastic elastomer composition in terms of rationalization of production process, recycling efficiency, and the like, and the thermoplastic elastomer composition has been widely used in the fields of automotive parts, home appliances, medical equipment parts, electric wires, sundries, and the like. The thermoplastic elastomer composition has been heavily used particularly in the applications of automotive sealants and building material sealants.

Since automotive sealants and building material sealants have complex structures, it has been common to join members formed of a thermoplastic elastomer composition to one another in order to manufacture intended members. Known examples of the technique for joining molded bodies formed of a thermoplastic elastomer composition to one another without using an adhesive or the like include a technique in which thermal fusion bonding is performed with a joint member produced by mixing an olefin copolymer rubber, a mineral oil rubber softener, and a polypropylene resin with one another at a specific ratio and subsequently performing dynamic crosslinking, as described in PTL 1.

PTL 2 discloses a technique for producing a thermoplastic elastomer for corner joint members for automotive composite molded bodies with which vulcanized rubber molded bodies can be fusion-bonded to one another at a sufficient level. In this technique, an olefin copolymer rubber, a crystalline ethylene copolymer, and a polypropylene resin are mixed with one another at a specific ratio and dynamic crosslinking is subsequently performed.

PTL 3 discloses a technique for producing a joint member for composite molded bodies which is excellent in terms of sliding performance, fusion bonding capability, and compression set (setting resistance) at high temperatures. In this technique, a thermoplastic elastomer composition produced by mixing a styrene-butadiene nonhydrogenated block copolymer having a specific viscosity, a styrene-butadiene hydrogenated block copolymer, a hydrocarbon rubber softener, and a polypropylene resin with one another at a specific ratio and subsequently performing dynamic crosslinking is used.

PTL 1: JP 2008-266615 A
PTL 2: JP 2003-155386 A
PTL 3: JP 2019-131722 A

Joint members for automotive composite molded bodies which are formed of a thermoplastic elastomer composition have been required to have excellent properties in terms of sliding performance, capability of fusion bonding to extrusion-molded members, and compression set (setting resistance) at high temperatures and suitable moldability (flowability).

Although the joint member described in PTL 1, which is formed of a thermoplastic elastomer composition, has suitable adhesion to elastomer molded bodies, in PTL 1, no mention is made of sliding performance, which is essential for joint members for automotive composite molded bodies. In general, although the addition of a lubricant, such as a silicone oil or oleamide, enables high sliding performance to be achieved, a lubricant, which has a low surface tension, may be exposed at the surface bonded to a molded body to degrade the capability of fusion bonding to the molded body. In addition, in PTL 1, since a low-flowability propylene homopolymer (MFR: 0.7 g/10 min (230° C., 21.18 N)) is used as a polypropylene resin, flowability is low and injection moldability is at an insufficient level.

Although the joint member described in PTL 2, which is formed of a thermoplastic elastomer composition, has suitable adhesion to molded bodies formed of a vulcanized rubber, in PTL 2, no mention is also made of sliding performance, which is essential for joint members for automotive composite molded bodies. Moreover, in PTL 2, although the compression set (setting resistance) under the conditions of 70° C. and 22 hours is mentioned, it exceeds 60% in some cases and is at an insufficient level. Furthermore, the compression set at high temperatures (100° C. and 22 hours) may become further degraded.

Although the joint member described in PTL 3, which is formed of a thermoplastic elastomer composition, is suitable in terms of capability of fusion bonding to extrusion-molded members and compression set (setting resistance) at high temperatures, tensile properties required for the elastomer composition as a joint member may be poor because a low-viscosity block copolymer has a low molecular weight. Thus, there is room for improvement in PTL 3.

As described above, a thermoplastic elastomer composition that has all of suitable sliding performance, suitable fusion bonding capability, suitable compression set (setting resistance) at high temperatures, and suitable workability in a balanced manner and is suitable as a joint member for automotive composite molded bodies has not been provided.

SUMMARY OF INVENTION

An object of the present invention is to provide a thermoplastic elastomer composition that has excellent sliding performance, excellent fusion bonding capability, and suitable compression set (setting resistance) at high temperatures, a joint member that includes the thermoplastic elastomer composition, a method for producing the joint member, and an automotive composite molded body that includes the joint member.

Solution to Problem

The inventor of the present invention found that using a styrene-butadiene hydrogenated block copolymer having a specific molecular weight and a polypropylene resin at a specific ratio improves compression set at high temperatures, also enhances sliding performance, and consequently enables the above object to be achieved and made the present invention.

Specifically, the summary of the present invention is as follows.

[1] A joint member comprising a thermoplastic elastomer composition including components (A), (B), and (C) below, wherein an amount of the component (B) is 100 to 140 parts by mass and an amount of the component (C) is 60 to 140 parts by mass relative to 100 parts by mass of the component (A),
wherein the thermoplastic elastomer composition is formed by performing crosslinking with a component (D), and
wherein a compression set of the thermoplastic elastomer composition, the compression set being measured under conditions of 70° C., 22 hours, and 25% compression in accordance with JIS K 6262, is 60% or less,
Component (A): a hydrogenated product of a block copolymer including at least two polymer blocks composed primarily of a vinyl aromatic compound and at least one polymer block including butadiene, wherein, in the hydrogenated product of the block copolymer, a proportion of a hydrogenated product (A1) of a block copolymer having a weight-average molecular weight of 300,000 or more is 30% to 100% by mass,
Component (B): a hydrocarbon rubber softener,
Component (C): a polypropylene resin,
Component (D): a crosslinking agent.

[2] The joint member according to [1], wherein the component (C) includes a propylene random copolymer having a melting peak temperature of 100° C. or more and less than 157° C.

[3] The joint member according to [1] or [2], wherein a content of the component (D) in the thermoplastic elastomer composition is 0.5 parts by mass or more and 10.0 parts by mass or less relative to 100 parts by mass of the component (A).

[4] An automotive composite molded body comprising the joint member according to any one of [1] to [3].

[5] A method for producing a joint member, the method comprising melt-kneading a thermoplastic elastomer composition including components (A), (B), (C), and (D) below, wherein an amount of the component (B) is 100 to 140 parts by mass and an amount of the component (C) is 60 to 140 parts by mass relative to 100 parts by mass of the component (A), and injection-molding the kneaded thermoplastic elastomer composition,
Component (A): a hydrogenated product of a block copolymer including at least two polymer blocks composed primarily of a vinyl aromatic compound and at least one polymer block including butadiene, wherein, in the hydrogenated product of the block copolymer, a proportion of a hydrogenated product (A1) of a block copolymer having a weight-average molecular weight of 300,000 or more is 30% to 100% by mass,
Component (B): a hydrocarbon rubber softener,
Component (C): a polypropylene resin,
Component (D): a crosslinking agent.

[6] A thermoplastic elastomer composition comprising components (A), (B), and (C) below, wherein an amount of the component (B) is 100 to 140 parts by mass and an amount of the component (C) is 60 to 140 parts by mass relative to 100 parts by mass of the component (A),
wherein the thermoplastic elastomer composition is formed by performing crosslinking with a component (D), and
wherein a compression set of the thermoplastic elastomer composition, the compression set being measured under conditions of 70° C., 22 hours, and 25% compression in accordance with JIS K 6262, is 60% or less,
Component (A): a hydrogenated product of a block copolymer including at least two polymer blocks composed primarily of a vinyl aromatic compound and at least one polymer block including butadiene, wherein, in the hydrogenated product of the block copolymer, a proportion of a hydrogenated product (A1) of a block copolymer having a weight-average molecular weight of 300,000 or more is 30% to 100% by mass,
Component (B): a hydrocarbon rubber softener,
Component (C): a polypropylene resin,
Component (D): a crosslinking agent.

[7] The thermoplastic elastomer composition according to [6], the thermoplastic elastomer composition having a density of 0.90 to 0.95 g/cm$^3$.

[8] The thermoplastic elastomer composition according to [6] or [7], wherein a melt flow rate of the thermoplastic elastomer composition, the melt flow rate being measured at a temperature of 230° C. and a load of 21.2 N in accordance with JIS K 7210, is 10 to 80 g/10 min.

Advantageous Effects of Invention

The thermoplastic elastomer composition according to the present invention has excellent workability and is also suitable in terms of sliding performance, fusion bonding capability, and compression set (setting resistance) at high temperatures. It is possible to produce a joint member for composite molded bodies which is excellent in terms of sliding performance, fusion bonding capability, and compression set (setting resistance) at high temperatures by using the thermoplastic elastomer composition according to the present invention with suitable workability.

A joint member formed of the thermoplastic elastomer composition according to the present invention, which is excellent in terms of sliding performance, fusion bonding capability, compression set (setting resistance) at high temperatures, and workability, is effectively used as an automotive sealant or a building material sealant. A joint member formed of the thermoplastic elastomer composition according to the present invention is particularly effectively used as a joint member for automotive composite molded bodies, such as an automotive glass run channel.

DESCRIPTION OF EMBODIMENTS

Details of the present invention are described below. The present invention is not limited by the following description.

Various alternation and modification may be made without departing from the scope of the present invention.

Hereinafter, in the case where a range is expressed using two numerical or physical property values and "to" interposed therebetween, it is considered that the range includes the numerical or physical property values before and after "to".

<Thermoplastic Elastomer Composition>

The thermoplastic elastomer composition of the present invention comprises components (A), (B), and (C) below, wherein an amount of the component (B) is 100 to 140 parts by mass and an amount of the component (C) is 60 to 140 parts by mass relative to 100 parts by mass of the component (A), wherein the thermoplastic elastomer composition is formed by performing crosslinking with a component (D), and wherein a compression set of the thermoplastic elastomer composition, the compression set being measured under conditions of 70° C., 22 hours, and 25% compression in accordance with JIS K 6262, is 60% or less.

Component (A): a hydrogenated product of a block copolymer including at least two polymer blocks composed primarily of a vinyl aromatic compound and at least one polymer block including butadiene, wherein, in the hydrogenated product of the block copolymer, a proportion of a hydrogenated product (A1) of a block copolymer having a weight-average molecular weight of 300,000 or more is 30% to 100% by mass Component (B): a hydrocarbon rubber softener Component (C): a polypropylene resin Component (D): a crosslinking agent

[Mechanism]

The thermoplastic elastomer composition according to the present invention is excellent in terms of sliding performance, fusion bonding capability, and compression set (setting resistance) at high temperatures and also has suitable workability.

Details of the reasons for which the thermoplastic elastomer composition according to the present invention has the above-described advantageous effects are not clear but are presumably as follows.

1) Carbon-carbon double bond portions present in a small amount in the hydrogenated product (A1) of a block copolymer having a weight-average molecular weight of 300,000 or more, which makes up 30 parts by mass or more and 100 parts by mass or less out of 100 parts by mass of the component (A), serve as crosslinking points to which the crosslinking agent or crosslinking aid used as a component (D) for dynamic crosslinking is bonded and allow loose linkages between molecular chains to be formed. This enhances rubber elasticity, that is, compression set (setting resistance), at high temperatures.

2) Kneading the hydrogenated product (A1) of a block copolymer having a weight-average molecular weight of 300,000 or more together with the crosslinking agent or crosslinking aid used as a component (D) enables the rubber component to be dispersed in a small dispersion diameter during kneading and also enhances the flatness and smoothness of the surface of the resulting molded body. This enables suitable sliding performance to be achieved.

3) As a result of the rubber component used as a component (A) producing suitable sliding performance, it becomes possible to reduce the amount of lubricant used, such as a silicone oil, which reduces surface tension (capability of fusion bonding to a member to which the thermoplastic elastomer composition is to be bonded). This enhances fusion bonding capability.

4) Since the component (A), which is a rubber component, is composed primarily of a vinyl aromatic compound unit, the component (A) is capable of containing a larger amount of rubber softener than an olefin rubber. This allows the thermoplastic elastomer composition according to the present invention to have an adequate flowability of 10 to 80/10 min (230° C., 21.2 N), which is appropriate for injection molding. Thus, the thermoplastic elastomer composition has suitable workability.

5) Since the thermoplastic elastomer composition according to the present invention includes a crosslinking agent as a component (D), crosslinking points at which the molecular chains of the elastomer and a member to which the thermoplastic elastomer composition is to be bonded are joined to each other are formed when the thermoplastic elastomer composition is thermal fusion-bonded, by injection molding, to an olefin rubber that is the member to which the thermoplastic elastomer composition is to be bonded. This enhances fusion bonding capability.

[Component (A)]

The component (A) included in the thermoplastic elastomer composition according to the present invention is a hydrogenated product of a block copolymer (hydrogenated block copolymer) including at least two polymer blocks composed primarily of a vinyl aromatic compound (hereinafter, such a polymer block may be referred to as "block P") and at least one polymer block including butadiene (hereinafter, this polymer block may be referred to as "block Q"). Relative to 100 parts by mass of the hydrogenated block copolymer used as a component (A), the proportion of a hydrogenated block copolymer (A1) having a weight-average molecular weight of 300,000 or more is 30 parts by mass or more and 100 parts by mass or less.

Note that the expression "polymer composed primarily of a vinyl aromatic compound" used herein refers to a polymer produced by polymerizing monomers composed primarily of a vinyl aromatic compound. The expression "polymer including butadiene" used herein refers to a polymer produced by polymerizing monomers including butadiene. The expression "composed primarily of a vinyl aromatic compound" used herein means that the content of a vinyl aromatic compound is 50 mol % or more.

When the proportion of the hydrogenated block copolymer (A1) having a weight-average molecular weight of 300,000 or more relative to 100 parts by mass of the component (A) is equal to or more than the above lower limit, suitable compression set (setting resistance) and suitable fusion bonding capability can be achieved. When the proportion of the hydrogenated block copolymer (A1) having a weight-average molecular weight of 300,000 or more is low within the above range, suitable flowability may be achieved.

The weight-average molecular weight of the hydrogenated block copolymer (A1) is a weight-average molecular weight determined by gel permeation chromatography (hereinafter, may be abbreviated as "GPC") in terms of polystyrene. The weight-average molecular weight of the hydrogenated block copolymer (A1) is 300,000 or more, is preferably 320,000 or more, and is more preferably 340,000 or more. The upper limit for the weight-average molecular weight of the hydrogenated block copolymer (A1) is commonly 600,000 or less, is preferably 580,000 or less, and is more preferably 560,000 or less. The above upper limit is further preferably 430,000 or less in consideration of fusion bonding strength.

When the weight-average molecular weight of the hydrogenated block copolymer (A1) falls within the above range, a sufficient degree of compression set and suitable sliding performance can be both achieved simultaneously.

The component (A) includes 30 to 100 parts by mass of the hydrogenated block copolymer (A1) relative to 100 parts by mass of the component (A). The content of the hydrogenated block copolymer (A1) in 100 parts by mass of the component (A) is preferably 35 to 100 parts by mass, is particularly preferably 40 to 100 parts by mass, and is further preferably 45 to 100 parts by mass in consideration of compression set (setting resistance) and fusion bonding capability.

The component (A) may include a hydrogenated block copolymer other than the hydrogenated block copolymer (A1), the other hydrogenated block copolymer being a hydrogenated product of a block copolymer including at least two polymer blocks P composed primarily of a vinyl aromatic compound and at least one polymer block Q including butadiene and having a weight-average molecular weight of less than 300,000 (hereinafter, this hydrogenated block copolymer may be referred to as "hydrogenated block copolymer (A2)"). In such a case, the weight-average molecular weight of the hydrogenated block copolymer (A2) is preferably 220,000 to 290,000 and is particularly preferably 230,000 to 280,000. The content of the hydrogenated block copolymer (A2) in the component (A) is 70 parts by mass or less and is preferably 65 parts by mass or less relative to 100 parts by mass of the component (A), which varies with the weight-average molecular weight of the hydrogenated block copolymer (A2). The average weight-average molecular weight of the component (A), which is calculated on the basis of the weight-average molecular weights and proportions of the hydrogenated block copolymers (A1) and (A2) in the component (A), is preferably 300,000 or more, is particularly preferably 305,000 to 340,000, and is further preferably 310,000 to 335,000.

In the case where the component (A) includes x parts by mass of the hydrogenated block copolymer (A1) having a weight-average molecular weight $W_a$ and y parts by mass of the hydrogenated block copolymer (A2) having a weight-average molecular weight $W_b$ (where x+y=100), the weight-average molecular weight W of the component (A) can be calculated using the following formula. It is preferable that the component (A) include the hydrogenated block copolymers (A1) and (A2) such that the W falls within the above range. In the case where the component (A) includes two or more hydrogenated block copolymers (A1) and two or more hydrogenated block copolymers (A2), the weight-average molecular weight W can be calculated in the same manner as above, on the basis of weight-average molecular weight and proportion.

$$W=\{(W_a \times x)+(W_b \times y)\}/100$$

Using the hydrogenated block copolymers (A1) and (A2) in combination under the above conditions enables working to be performed with suitable flowability while certain compression set (setting resistance) and certain fusion bonding capability are maintained.

In the case where the component (A) includes the hydrogenated block copolymers (A1) and (A2), a peak derived from the hydrogenated block copolymer (A1) and a peak derived from the hydrogenated block copolymer (A2) are detected in an elution curve determined by GPC. This confirms that the component (A) is a mixture of the hydrogenated block copolymers (A1) and (A2). Moreover, the proportions of the hydrogenated block copolymers (A1) and (A2) in the component (A) can be calculated on the basis of the ratio between the intensities of the above peaks.

The vinyl aromatic compound included in the monomers constituting the block P of the hydrogenated block copolymer used as a component (A) is preferably, but not limited to, styrene and/or a styrene derivative, such as α-methylstyrene. It is particularly preferable that the block P be composed primarily of styrene. The block P may include a monomer other than a vinyl aromatic compound as a raw material.

The block Q may include a monomer other than butadiene as a raw material. In such a case, the monomer raw material other than butadiene is preferably isoprene. It is preferable that the block Q be composed primarily of butadiene or butadiene and isoprene.

The expression "composed primarily of butadiene" used herein means that the content of butadiene is 50 mol % or more. The expression "composed primarily of butadiene and isoprene" used herein means that the total content of butadiene and isoprene is 50 mol % or more.

The weight proportion of the block P in the hydrogenated block copolymer used as a component (A) is preferably, but not limited to, 5% by mass or more and is more preferably 10% by mass or more; and is preferably 55% by mass or less, is more preferably 50% by mass or less, and is further preferably 45% by mass or less. When the weight proportion of the block P falls within the above range, the proportion of crosslinking reaction may be increased.

The chemical structure of the hydrogenated block copolymer used as a component (A) may be any of linear, branched, radial, etc. but is preferably the structure represented by Formula (1) or (2) below. In order to increase mechanical strength, the structure represented by Formula (1) below is more preferable.

$$P-(Q-P)m \quad (1)$$

$$(P-Q)n \quad (2)$$

where P represents the block P, Q represents the block Q, m represents an integer of 1 to 5, and n represents an integer of 2 to 5.

In Formulae (1) and (2), m and n are preferably maximized in order to lower the order-disorder transition temperature of a rubbery high-molecular compound and are preferably minimized in consideration of manufacturability and manufacturing costs. Preferably, m and n are 2 to 4.

In order to enhance rubber elasticity, the hydrogenated block copolymer used as a component (A) is preferably a hydrogenated block copolymer represented by Formula (1) compared with a hydrogenated block copolymer represented by Formula (2), is more preferably a hydrogenated block copolymer represented by Formula (1) in which m is 3 or less, and is further preferably a hydrogenated block copolymer represented by Formula (1) in which m is 2 or less.

Examples of the hydrogenated block copolymer used as a component (A) include a styrene-butadiene-styrene hydrogenated block copolymer and a styrene-isoprene-butadiene-styrene hydrogenated block copolymer. Among these, a styrene-butadiene-styrene hydrogenated block copolymer is suitable in order to readily achieve certain flowability required for capability of fusion bonding to olefin rubbers, which serve as members to which the thermoplastic elastomer composition is to be bonded when the thermoplastic elastomer composition is used as a joint member.

In the present invention, the method for producing the hydrogenated block copolymer used as a component (A) is not limited; any production method with which the above-described structure and physical properties can be achieved may be used. For example, the block copolymer can be produced by performing block polymerization using a lithium catalyst or the like in accordance with the method described in JP H7-97493 A. The hydrogenation of the block copolymer can be performed by, for example, the method described in JP S59-133203 A in an inert solvent in the presence of a hydrogenation catalyst.

Examples of commercial products of the hydrogenated block copolymer used as a component (A) include "TAIPOL-6151" and "TAIPOL-6159" produced by Taiwan Synthetic Rubber Corp. (TSRC); "G1651" and "G1633" produced by Kraton Polymers Japan Ltd.; and "Septon 4099" produced by Kuraray Co., Ltd.

Only one hydrogenated block copolymer that serves as a component (A) may be used alone. Alternatively, two or more hydrogenated block copolymers having different compositions and different physical properties may be used in combination. It is preferable to use two or more hydrogenated block copolymers in combination in order to readily control the overall property balance. In such a case, for example, it is suitable to use the hydrogenated block copolymers (A1) and (A2) in combination such that the above-described weight-average molecular weight W of the component (A) falls within the above suitable range.

[Component (B)]

The thermoplastic elastomer composition according to the present invention includes 100 parts by mass or more and 140 parts by mass or less of a hydrocarbon rubber softener that serves as a component (B) relative to 100 parts by mass of the component (A) in order to enhance moldability.

The lower limit for the content of the component (B) in the thermoplastic elastomer composition according to the present invention is commonly 100 parts by mass or more, is preferably 102 parts by mass or more, and is more preferably 104 parts by mass or more relative to 100 parts by mass of the component (A) in consideration of moldability. The upper limit for the content of the component (B) in the thermoplastic elastomer composition according to the present invention is commonly 140 parts by mass or less, is preferably 138 parts by mass or less, and is more preferably 136 parts by mass or less relative to 100 parts by mass of the component (A) in consideration of flexibility.

Examples of the hydrocarbon rubber softener used as a component (B) include a mineral oil softener and a synthetic resin softener. Among these, a mineral oil softener is preferable in consideration of affinity for the other components. The mineral oil softener is commonly a mixture of an aromatic hydrocarbon, a naphthenic hydrocarbon, and a paraffin hydrocarbon. A mineral oil in which 50% or more of all the carbon atoms are derived from a paraffin hydrocarbon is referred to as "paraffin oil". A mineral oil in which 30% to 45% of all the carbon atoms are derived from a naphthenic hydrocarbon is referred to as "naphthenic oil". A mineral oil in which 35% or more of all the carbon atoms are derived from an aromatic hydrocarbon is referred to as "aromatic oil". Among these, a paraffin oil is preferably used.

The kinematic viscosity of the hydrocarbon rubber softener used as a component (B) at 40° C. is preferably, but not limited to, 20 cSt or more and is more preferably 50 cSt or more; and is preferably 800 cSt or less and is more preferably 600 cSt or less. The flash point (COC method) of the hydrocarbon rubber softener is preferably 200° C. or more and is more preferably 250° C. or more.

The hydrocarbon rubber softener used as a component (B) is commercially available. Examples of the corresponding commercial products include "Nisseki Polybutene (registered trademark) HV" series produced by JX Nippon Oil & Energy Corporation; and "Diana (registered trademark) process oil PW" series produced by Idemitsu Kosan Co., Ltd. An appropriate item can be selected from the above commercial products.

Only one hydrocarbon rubber softener may be used alone as a component (B). Alternatively, two or more hydrocarbon rubber softeners may be used in any combination at any ratio as a component (B).

[Component (C)]

The thermoplastic elastomer composition according to the present invention includes 60 parts by mass or more and 140 parts by mass or less of a polypropylene resin that serves as a component (C) relative to 100 parts by mass of the component (A) in order to enhance moldability.

The lower limit for the content of the component (C) in the thermoplastic elastomer composition according to the present invention is commonly 60 parts by mass or more, is preferably 70 parts by mass or more, and is more preferably 80 parts by mass or more relative to 100 parts by mass of the component (A) in consideration of moldability. The upper limit for the content of the component (C) in the thermoplastic elastomer composition according to the present invention is commonly 140 parts by mass or less, is preferably 130 parts by mass or less, and is more preferably 120 parts by mass or less relative to 100 parts by mass of the component (A) in order to achieve certain hardness with which certain flexibility appropriate for molded articles can be achieved.

The component (C) preferably includes a propylene polymer having a melting peak temperature of 100° C. or more and less than 157° C. (hereinafter, this propylene polymer may be referred to as "component (C1)"). When the component (C) includes the component (C1), the component (C) may include another polypropylene resin, such as the component (C2) described below. The term "polypropylene resin" used herein refers to a resin in which the content of a propylene unit is 50% by mass or more. The component (C1) contributes primarily to injection moldability.

The melting peak temperature of the component (C1) included in the component (C) is preferably equal to or more than the above lower limit in consideration of heat resistance. The melting peak temperature of the component (C1) is preferably less than the above upper limit in consideration of compatibility with the component (A).

The melting peak temperatures of the component (C1) and the component (C2) described below can be measured by the following method in accordance with JIS K 7121.

The behavior of the polypropylene resin during melting is determined by conducting the following steps (1) to (3) with a differential scanning calorimeter (DSC6220 produced by SII NanoTechnology Inc.).

In each step, a melting curve is obtained by plotting time on the horizontal axis and the amount of heat of melting on the vertical axis. The top of the peak observed in the step (3) is considered a melting peak temperature.

Step (1): 5 mg of the sample is heated from room temperature at a rate of 100° C./min from 40° C. to 200° C. After the heating has been finished, holding is performed for 3 minutes.

Step (2): Cooling is performed from 200° C. to 40° C. at a rate of 10° C./min. After the cooling has been finished, holding is performed for 3 minutes.

Step (3): Heating is performed from 40° C. to 200° C. at a rate of 10° C./min.

The component (C1) is preferably a propylene random copolymer. The content of a propylene unit in the propylene random copolymer used as a component (C1) is preferably 60% to 99% by mass and is more preferably 80% to 98% by mass of the total amount of all the monomer units constituting the component (C1). The content of a propylene unit in the component (C1) preferably falls within the above range in order to readily adjust the melting peak temperature to fall within the above range.

The contents of the units constituting the component (C1) can be measured by infrared spectroscopy. The same applies to the component (C2) described below.

The propylene random copolymer used as a component (C1) is a copolymer including a propylene unit and a constitutional unit other than a propylene unit. Specific examples of the constitutional unit other than a propylene unit include an ethylene unit and α-olefin units other than a propylene unit. Examples of the constitutional unit other than a propylene unit which may be included in the component (C1) include an ethylene unit, a 1-butene unit, a 1-pentene unit, a 1-hexene unit, a 1-heptene unit, a 1-octene unit, a 1-nonene unit, a 1-decene unit, a 1-undecene unit, a 1-dodecene unit, a 1-tridecene unit, a 1-tetradecene unit, a 1-pentadecene unit, a 1-hexadecene unit, a 1-heptadecene unit, a 1-octadecene unit, a 1-nonadecene unit, a 1-eicosene unit, a 3-methyl-1-butene unit, a 3-methyl-1-pentene unit, a 4-methyl-1-pentene unit, a 2-ethyl-1-hexene unit, and a 2,2,4-trimethyl-1-pentene unit. The component (C1) may include only one of the above constitutional units. Alternatively, the component (C1) may include two or more of the above constitutional units. Preferable examples of the constitutional unit other than a propylene unit which is included in the component (C1) include an ethylene unit and a 1-butene unit.

Examples of a polypropylene resin other than the component (C1) which is included in the component (C) include a propylene polymer having a melting peak temperature of 157° C. or more and 175° C. or less (hereinafter, this propylene polymer may be referred to as "component (C2)"). The component (C2) is a component that primarily enhances the heat resistance of the thermoplastic elastomer composition.

Heat resistance can be enhanced since the component (C2) has a melting peak temperature of 157° C. or more. From the above viewpoint, the melting peak temperature of the component (C2) is preferably 160° C. or more. The upper limit for the melting peak temperature of the component (C2) is 175° C. or less and is preferably 170° C. or less in consideration of capability of fusion bonding to extrusion-molded members.

The content of a propylene unit in the propylene polymer used as a component (C2) is preferably 90% by mass or more and is more preferably 98% to 100% by mass of the total amount of all the monomer units constituting the component (C2). The content of a propylene unit in the component (C2) preferably falls within the above range in order to readily adjust the melting peak temperature to fall within the above range.

The propylene polymer used as a component (C2) may include a constitutional unit other than propylene. The component (C) may include, for example, an ethylene unit or an α-olefin unit other than propylene. In such a case, examples of the α-olefin unit that may be included in the component (C2) include a 1-butene unit, a 1-pentene unit, a 1-hexene unit, a 1-heptene unit, a 1-octene unit, a 1-nonene unit, a 1-decene unit, a 1-undecene unit, a 1-dodecene unit, a 1-tridecene unit, a 1-tetradecene unit, a 1-pentadecene unit, a 1-hexadecene unit, a 1-heptadecene unit, a 1-octadecene unit, a 1-nonadecene unit, a 1-eicosene unit, a 3-methyl-1-butene unit, a 3-methyl-1-pentene unit, a 4-methyl-1-pentene unit, a 2-ethyl-1-hexene unit, and a 2,2,4-trimethyl-1-pentene unit. The component (C2) may include only one of the above constitutional units other than propylene. Alternatively, the component (C2) may include two or more of the above constitutional units other than propylene. In the case where the component (C2) includes a constitutional unit other than a propylene unit, preferable examples of the other constitutional unit include an ethylene unit and a 1-butene unit.

In the case where the component (C) includes the component (C2), the content of the component (C2) in the component (C) is preferably 50% by mass or less and is preferably, for example, 5% to 50% by mass. Although the adding the component (C2) to the component (C) enhances heat resistance, if the content of the component (C2) is excessively high, the capability of fusion bonding to extrusion-molded members may become degraded.

For producing the propylene polymers used as components (C1) and (C2), the polymerization methods known in the related art in which a known catalyst for polymerization of olefins is used may be used. Examples of such polymerization methods include a polymerization method in which a Ziegler-Natta catalyst is used. Examples of the above polymerization method include slurry polymerization, solution polymerization, bulk polymerization, and gas phase polymerization. The above polymerization methods may be used in combination of two or more.

The components (C1) and (C2) are also commercially available. Examples of the corresponding commercial products include Prim Polypro (registered trademark) produced by Prime Polymer Co., Ltd.; Sumitomo Noblen (registered trademark) produced by Sumitomo Chemical Co., Ltd.; polypropylene block copolymer produced by SunAllomer Ltd.; NOVATEC (registered trademark) PP produced by Japan Polypropylene Corporation; Moplen (registered trademark) produced by LyondellBasell; ExxonMobil PP produced by ExxonMobil; Formolene (registered trademark) produced by Formosa Plastics; Borealis PP produced by Borealis; SEETEC PP produced by LG Chemical; ASI POLYPROPYLENE produced by A.Schulman; INEOS PP produced by INEOS Olefins&Polymers; Braskem PP produced by Braskem; Sumsung Total produced by SAMSUNG TOTAL PETROCHEMICALS; Sabic (registered trademark) PP produced by Sabic; TOTAL PETROCHEMICALS Polypropylene produced by TOTAL PETROCHEMICALS; and YUPLENE (registered trademark) produced by SK. The components (C1) and (C2) can be selected appropriately from the above commercial products and used in combination.

Only one types of component (C1) or (C2) may be used alone. Alternatively, two or more types of components (C1) or (C2) having different compositions or physical properties may be used in combination.

[Component (D)]

The thermoplastic elastomer composition according to the present invention includes a crosslinking agent as a component (D). In the production of the thermoplastic elastomer composition according to the present invention, a dynamic heat treatment is performed in the presence of a crosslinking agent used as a component (D) in order to crosslink at least a part of the component (A). This enhances rubber elasticity.

Examples of the crosslinking agent include an organic peroxide, a phenolic resin, and crosslinking aids other than an organic peroxide or phenolic resin. The above crosslinking agents may be used alone or in combination of two or more.

The organic peroxide that can be used as a crosslinking agent may be either an aromatic or aliphatic organic peroxide. Specific examples thereof include dialkyl peroxides, such as di-t-butyl peroxide, t-butyl cumyl peroxide, dicumyl peroxide, 2,5-dimethyl-2,5-di(t-butylperoxy)hexane, 2,5-dimethyl-2,5-di(t-butylperoxy)-3-hexyne, 1,3-bis(t-butylperoxyisopropyl)benzene, and 1,1-di(t-butylperoxy)-3,3,5-trimethylcyclohexane; peroxy esters, such as t-butyl peroxybenzoate, t-butylperoxy isopropyl carbonate, 2,5-dimethyl-2,5-di(benzoylperoxy)hexane, and 2,5-dimethyl-2,5-di(benzoylperoxy)-3-hexyne; and hydroperoxides, such as acetyl peroxide, lauroyl peroxide, benzoyl peroxide, p-chlorobenzoyl peroxide, and 2,4-dichlorobenzoyl peroxide. Among these, 2,5-dimethyl-2,5-di(t-butylperoxy)hexane is preferable. The above organic peroxides may be used alone or in combination of two or more.

Examples of the phenolic resin that can be used as a crosslinking agent include an alkyl phenol formaldehyde and an alkyl phenol formaldehyde bromide. The above phenolic resins may be used alone or in combination of two or more.

Examples of the crosslinking aids other than an organic peroxide or phenolic resin include crosslinking aids for peroxides, such as sulfur, p-quinone dioxime, p-dinitrosobenzene, and 1,3-diphenylguanidine; crosslinking aids for phenolic resins, such as anhydrous tin chloride, tin chloride dihydrate, and ferric chloride; polyfunctional vinyl compounds, such as divinylbenzene, triallyl cyanurate, triallyl isocyanurate, and diallyl phthalate; and polyfunctional (meth)acrylates, such as ethylene glycol di(meth)acrylate, diethylene glycol di(meth)acrylate, polyethylene glycol di(meth)acrylate, trimethylolpropane tri(meth)acrylate, and allyl (meth)acrylate. The above crosslinking aids may be used alone or in combination of two or more.

The amount of the component (D) used is preferably 0.5 parts by mass or more, is more preferably 1.0 parts by mass or more, and is further preferably 1.5 parts by mass or more relative to 100 parts by mass of the total amount of the component (A) in order to conduct the crosslinking reaction to a sufficient degree. The amount of the component (D) used is preferably 10.0 parts by mass or less, is more preferably 9.0 parts by mass or less, and is further preferably 8.0 parts by mass or less relative to 100 parts by mass of the total amount of the component (A) in order to control the crosslinking reaction.

[Other Components]

In the production of the thermoplastic elastomer composition according to the present invention, a component other than the components (A) to (D) may be used as needed as a raw material such that the advantageous effects of the present invention are not impaired.

Examples of the other component include resins, such as thermoplastic resins and elastomers other than the component (A) or (C); and various types of additives, such as an antioxidant, a filler, a heat stabilizer, a photostabilizer, an ultraviolet absorber, a neutralizer, a lubricant, an antifogging agent, an antiblocking agent, a slip agent, a dispersing agent, a colorant, a flame retardant, an antistatic agent, a conductivity-imparting agent, a metal deactivator, a molecular weight modifier, an antimicrobial agent, an antifungal agent, and a fluorescent brightening agent. Any of the above resins and additives may be used alone or in combination of two or more.

Examples of the thermoplastic resins other than the component (A) or (C) include polyphenylene ether resins; polyamide resins, such as nylon 6 and nylon 66; polyester resins, such as polyethylene terephthalate and polybutylene terephthalate; polyoxymethylene resins, such as a polyoxymethylene homopolymer and a polyoxymethylene copolymer; and polymethyl methacrylate resins and polyolefin resins (except those that correspond to the component (C)).

Examples of the elastomers other than the component (A) or (C) include styrene elastomers (except those that correspond to the component (A)); polyester elastomers; and polybutadiene.

Examples of the lubricant (hereinafter, may be referred to as "component (E)") include a silicone oil, a silicone masterbatch, and a liquid siloxane wax. In the case where the lubricant is used, the amount of the lubricant used is commonly 0.5 to 50 parts by mass and is preferably 1 to 25 parts by mass relative to 100 parts by mass of the total amount of the component (A).

As described above, the amount of the lubricant used in the present invention can be reduced as a result of the component (A) enhancing the sliding performance. As described above, adding a small amount of lubricant, that is, specifically, 20 parts by mass or less of a lubricant relative to 100 parts by mass of the total amount of the component (A), enables excellent sliding performance to be achieved while limiting the degradation of fusion bonding capability.

Examples of the antioxidant (hereinafter, may be referred to as "component (F)") include phenolic antioxidants, phosphite antioxidants, and thioether antioxidants. In the case where the antioxidant is used, the amount of the antioxidant used is commonly 0.01 to 3.0 parts by mass and is preferably 0.15 to 0.6 parts by mass relative to 100 parts by mass of the total amount of the component (A). When the content of the antioxidant falls within the above range, suitable thermal stability can be achieved.

Examples of the filler include glass fibers, hollow glass balls, carbon fibers, talc, calcium carbonate, mica, potassium titanate fibers, silica, metal soap, titanium dioxide, and carbon black. In the case where the filler is used, the amount of the filler used is commonly 0.3 to 100 parts by mass relative to 100 parts by mass of the total amount of the component (A).

[Method for Producing Thermoplastic Elastomer Composition]

The thermoplastic elastomer composition according to the present invention is preferably a thermoplastic elastomer composition produced by subjecting a composition that includes the components (A), (B), and (C), the other components, etc. in predetermined amounts to a dynamic heat treatment in the presence of the component (D) that is a crosslinking agent.

Alternatively, the thermoplastic elastomer composition according to the present invention may also be produced by mixing the component (A) that has been crosslinked using the component (D) with the components (B) and (C), the other components, etc. and subjecting the resulting mixture to a dynamic heat treatment.

The term "dynamic heat treatment" used herein refers to performing kneading in the presence of a crosslinking agent in a molten or semi-molten state. The dynamic heat treatment is preferably performed by melt kneading. Examples of a mixer kneader used for melt kneading include a closed Banbury mixer, a mixing roller, a kneader, and a twin-screw extruder. Among these, a twin-screw extruder is preferably used. A production method according to a preferable aspect in which a twin-screw extruder is used include performing a dynamic heat treatment while feeding the above components to raw material feed ports (hoppers) of a twin-screw extruder having plural raw material feed ports.

The temperature at which the dynamic heat treatment is performed is commonly 80° C. to 300° C. and is preferably 100° C. to 250° C. The amount of time during which the dynamic heat treatment is performed is commonly 0.1 to 30 minutes.

In the case where the thermoplastic elastomer composition according to the present invention is produced by performing the dynamic heat treatment with a twin-screw extruder, the radius (R (mm)) of the barrel of the twin-screw extruder, the rotation speed (N (rpm)) of the screw, and the discharge rate (W (kg/hr)) preferably satisfy the relationship represented by Formula (I) below and more preferably satisfy the relationship represented by Formula (II) below while extrusion is performed.

$$2.6 < NW/R^3 < 22.6 \quad (I)$$

$$3.0 < NW/R^3 < 20.0 \quad (II)$$

The above relationship among the radius (R (mm)) of the barrel of the twin-screw extruder, the rotation speed (N (rpm)) of the screw, and the discharge rate (W (kg/hr)) is preferably more than the above lower limit in order to produce the thermoplastic elastomer composition with efficiency. The above relationship is preferably less than the above upper limit in order to reduce the amount of heat generated as a result of shearing and the formation of foreign matter that causes poor appearance.

[Physical Properties of Thermoplastic Elastomer Composition]

The compression set of the thermoplastic elastomer composition according to the present invention which is measured in accordance with JIS K 6262 under the conditions of 70° C., 22 hours, and 25% compression is 60% or less. When the compression set of the thermoplastic elastomer composition according to the present invention at 70° C. is 60% or less, sufficient durability to a compressed state can be achieved even in the case where the thermoplastic elastomer composition according to the present invention is used for producing automotive sealants, building material sealants, or the like, which are repeatedly brought into a compressed state as a result of closing and opening of a window frame, a door frame, or the like.

The compression set of the thermoplastic elastomer composition according to the present invention which is measured in accordance with JIS K 6262 under the conditions of 100° C., 22 hours, and 25% compression is preferably less than 80%. When the compression set of the thermoplastic elastomer composition according to the present invention at 100° C., that is, high temperatures, is less than 80%, further sufficient durability to a compressed state can be achieved even in the case where the thermoplastic elastomer composition according to the present invention is used for producing automotive sealants, building material sealants, or the like, which are repeatedly brought into a compressed state as a result of closing and opening of a window frame, a door frame, or the like. The compression set of the thermoplastic elastomer composition according to the present invention at 100° C. is more preferably less than 75%.

The melt flow rate (MFR) of the thermoplastic elastomer composition according to the present invention which is measured by a method conforming to JIS K 7210 at a temperature of 230° C. and a load of 21.2 N is preferably 10 g/10 min or more, is more preferably 15 g/10 min or more, and is further preferably 20 g/10 min or more in consideration of moldability. The melt flow rate (MFR) of the thermoplastic elastomer composition according to the present invention is preferably 80 g/10 min or less, is more preferably 75 g/10 min or less, and is further preferably 70 g/10 min or less in consideration of moldability.

The density of the thermoplastic elastomer composition according to the present invention which is measured by a method conforming to Method A of ISO 1183 (Immersion Method) is preferably 0.95 g/cm³ or less in consideration of weight reduction. The above density is more preferably 0.93 g/cm³ or less and is further preferably 0.91 g/cm³ or less. The lower limit for the above density is commonly 0.90 g/cm³ or more in consideration of the density of the polypropylene resin used as a component (C).

The lower limit for the tensile stress of the thermoplastic elastomer composition according to the present invention at break which is measured in accordance with the measuring method described in JIS K 6251 is preferably 8.5 MPa or more and is more preferably 9.0 MPa or more in order to achieve adequate fittability to base materials in the case where the thermoplastic elastomer composition is used as a joint member. The upper limit for the tensile stress of the thermoplastic elastomer composition at break is preferably 15.0 MPa or less and is more preferably 14.5 MPa or less in order to prevent a joint member fit to a base material from detaching from the base material.

From the same viewpoint as above, the elongation of the thermoplastic elastomer composition at break which is measured in accordance with the measuring method described in JIS K 6251 is preferably 650% or more and is more preferably 700% or more. The upper limit for the elongation of the thermoplastic elastomer composition at break is preferably 1200% or less and is more preferably 1100% or less in order to prevent a joint member fit to a base material from detaching from the base material.

<Molded Body and Applications>

The thermoplastic elastomer composition according to the present invention can be formed into a molded body by a molding method commonly used for thermoplastic elastomer compositions, such as injection molding, extrusion molding, hollow molding, or compression molding. Among these, injection molding is suitably used for molding the thermoplastic elastomer composition according to the present invention. Optionally, subsequent to the above molding, the molded body may be subjected to a secondary working, such as lamination molding or thermoforming.

A molded body formed by molding the thermoplastic elastomer composition according to the present invention can be applied to a variety of fields described below: automotive parts, such as a skin, weatherstripping, a headliner material, an interior sheet, a bumper molding, a side molding, an air spoiler, an air duct hose, and a sealant; civil engineering and construction material parts, such as a water stop, a joint sealer, a window frame, and a sealant; sporting goods, such as a golf grip and a tennis racket grip; industrial parts, such as a hose tube and a gasket; home appliance parts, such as a hose and a packing; medical parts, such as a medical container, a gasket, and a packing; food parts, such as a container and a packing; medical equipment parts; electric wires; sundries; and the like.

Among these, a molded body produced by molding the thermoplastic elastomer composition according to the present invention is suitably used particularly as an automotive sealant or a building material sealant and is suitably used as an automotive sealant and, specifically, an automotive glass run channel.

<Joint Member>

A joint member according to the present invention is formed of the above-described thermoplastic elastomer composition according to the present invention. The joint member according to the present invention is produced by melt-kneading the thermoplastic elastomer composition according to the present invention and injection-molding the kneaded thermoplastic elastomer composition against an extrusion-molded member that is a member to which the thermoplastic elastomer composition is to be bonded. The member to which the thermoplastic elastomer composition is to be bonded is preferably an olefin rubber. Specific examples of the olefin rubber include an olefin thermoplastic elastomer and a sulfur-vulcanized rubber. It is preferable to use an olefin thermoplastic elastomer the base resin of which is a polypropylene resin similarly to the thermoplastic elastomer composition according to the present invention, in order to achieve suitable fusion bonding capability.

In particular, the joint member according to the present invention is suitably used as a joint member included in automotive composite molded bodies, such as an automotive glass run channel.

Figure 1:
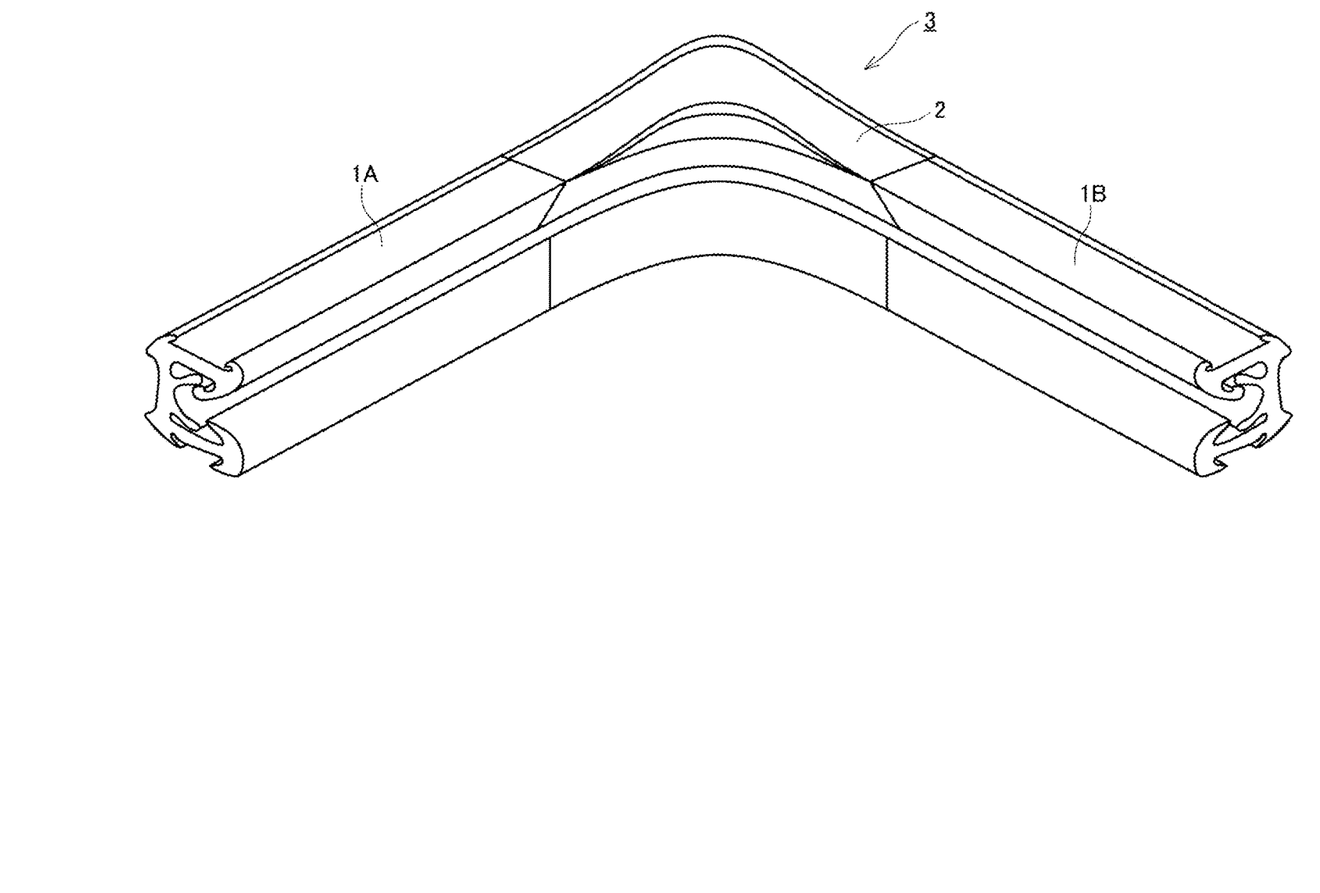
FIG. 1 is a perspective view of an example of an automotive glass run channel to which the present invention is applied.

FIG. 1 is a perspective view of an example of the automotive glass run channel, which is an automotive composite molded body 3. The automotive composite molded body 3 includes extrusion-molded members 1A and 1B that have been formed by extrusion-molding a thermoplastic elastomer composition, which constitute linear portions, and a corner portion which is a joint member 2 according to the present invention and with which the extrusion-molded members 1A and 1B are fusion-bonded to each other to form a single body.

The above-described composite molded body 3 can be produced by, for example, inserting joint-side edges of the extrusion-molded members 1A and 1B into a mold for injection molding and injection-molding the thermoplastic elastomer composition according to the present invention into the mold in order to form the joint member 2 that serves as a corner portion while merging the end surfaces of the extrusion-molded members 1A and 1B with the joint member 2 by fusion bonding.

The thermoplastic elastomer composition that constitutes the extrusion-molded members 1A and 1B is not limited but is preferably an olefin thermoplastic elastomer or a styrene thermoplastic elastomer in order to achieve excellent capability of fusion bonding to the thermoplastic elastomer composition according to the present invention and markedly high mechanical strength and excellent compression set (setting resistance) appropriate for frames of automotive glass run channels.

EXAMPLES

The contents of the present invention are described more specifically with reference to Examples below. The present invention is not limited by Examples below without departing from the scope of the present invention. Note that the values described in the description of the production conditions and evaluation results in Examples below mean the upper and lower limits preferable in an aspect of the present invention. A preferable range may be defined by a combination of the upper or lower limit and a value described in Examples below or a combination of values described in Examples below.

<Raw Materials>

The raw materials used in Examples and Comparative examples below are as follows.

[Component (A)]
{Hydrogenated Block Copolymer (A1)}
<A1-1>

Styrene-butadiene-styrene hydrogenated block copolymer (having the structure represented by Formula (1) above, styrene (block P) content: 32 mass %, weight-average molecular weight: 390,000)/"TAIPOL-6159" produced by Taiwan Synthetic Rubber Corp. (TSRC)

<A1-2>

Styrene-isoprene-butadiene-styrene hydrogenated block copolymer (having the structure represented by Formula (1) above, styrene (block P) content: 30 mass %, weight-average molecular weight: 452,000/"Septon 4099" produced by Kuraray Co., Ltd.

{Hydrogenated Block Copolymer (A2)}
<A2-1>

Styrene-butadiene-styrene hydrogenated block copolymer (having a structure represented by Formula (1) above, styrene (block P) content: 32 mass %, weight-average molecular weight: 260,000)/"TAIPOL-6151" produced by Taiwan Synthetic Rubber Corp. (TSRC)

[Component (B)]
<B-1>

Paraffinic rubber softener (kinematic viscosity at 40° C.: 95.5 cSt, pour point: −15° C., flash point: 272° C.)/"Diana (registered trademark) process oil PW90" produced by Idemitsu Kosan Co., Ltd.

[Component (C)]
<C-1>

Propylene-ethylene random copolymer (MFR (JIS K7210): 30 g/10 min (230° C., 21.2N), melting peak temperature: 155° C., propylene unit content: 98 mass %)/"NOVATEC (registered trademark) PP MG03BD" produced by Japan Polypropylene Corporation

[Component (D)]
<D-1>

Mixture of 40 parts by mass of 2,5-dimethyl-2,5-di(t-butylperoxy)hexane and 60 parts by mass of calcium carbonate/"Kayahexa AD40C" produced by Kayaku Akzo Co., Ltd.

<D-2>

Mixture of 55 parts by mass of divinylbenzene and 45 parts by mass of ethyl vinyl benzene/"Divinylbenzene" produced by Wako Pure Chemical Industries, Ltd.

[Component (E)]
<E-1>

Silicone oil/"KF96-100CS" produced by Shin-Etsu Chemical Co., Ltd.

[Component (F)]
<F-1>

Phenolic antioxidant/"Irganox (registered trademark) 1010" produced by BASF Japan Ltd.

[Evaluation Methods]

Each of the thermoplastic elastomer compositions prepared in Examples and Comparative examples was evaluated by the following methods.

In the measurements (1) to (6) below, a sheet (width: 120 mm, length: 80 mm, and thickness: 2 mm) prepared by injection-molding a specific one of the thermoplastic elastomer compositions with an in-line screw injection molding machine ("IS130" produced by Toshiba Machine Co., Ltd.) at an injection pressure of 50 MPa, a cylinder temperature of 220° C., and a mold temperature of 40° C. was used.

(1) Duro A Hardness: The hardness observed 15 seconds after an indenter had been pressed against the specimen was measured in accordance with JIS K 6253(JIS-A).

The Duro A hardness is preferably 35 to 95 and is particularly preferably 40 to 98.

(2) Tensile Stress at Break: Tensile stress at break was measured in accordance with the method for measuring tensile stress at break which is described in JIS K 6251, as an index of the strength of the thermoplastic elastomer composition. The higher the tensile stress at break, the superior tensile properties required by thermoplastic elastomer composition were evaluated.

(3) Elongation at Break: Elongation at break was measured in accordance with the method for measuring elongation at break which is described in JIS K 6251, as an index of the strength of the thermoplastic elastomer composition. The higher the elongation at break, the superior tensile properties required by the thermoplastic elastomer composition were evaluated.

(4) Compression Set: Measurement was conducted under the conditions of 70° C., 22 hours, and 25% compression in accordance with JIS K 6262.

The compression set measured under the conditions of 70° C., 22 hours, and 25% compression is preferably 60% or less.

(5) Compression Set at High Temperatures: Measurement was conducted under the conditions of 100° C., 22 hours, and 25% compression in accordance with JIS K 6262.

Evaluation was made on the basis of the compression set (CS, setting resistance) measured, in accordance with the following standard.

A: CS was less than 75%
B: CS was 75% or more and less than 80%
C: CS was 80% or more (6) Coefficients of Static Friction and Kinetic Friction In the measurement of the coefficients of static friction and kinetic friction, the sheet (width: 120 mm, length: 80 mm, and thickness: 2 mm) prepared by injection molding was cut into a size of 60 cm×45 cm X and, on the resulting test piece, a 200-gram weight bonded to a glass plate (length: 110 mm X width: 110 mm X thickness: 3 mm) with a double-faced adhesive tape was moved 6 cm. The measurement of the coefficients of static friction and kinetic friction was conducted three times, and the averages thereof were calculated.

The coefficient of static friction was evaluated in accordance with the following standard.

A: The coefficient of static friction was less than 1.55
B: The coefficient of static friction was 1.55 or more and less than 1.65
C: The coefficient of static friction was 1.65 or more (7) Strength of Fusion Bonding to TPV (Dynamically Cross-linked Thermoplastic Elastomer) and Fusion Bonding Elongation An injection-molded sheet formed of a dynamically cross-linked thermoplastic olefin elastomer ("TREXPRENE (registered trademark) 3855N" produced by Mitsubishi Chemical Corporation) having a thickness of 2 mm was cut into a size of 10 cm×5 cm. The resulting specimen was charged into a mold of a 110-ton injection molding machine. A specific one of the thermoplastic elastomer compositions was injected into the mold at a cylinder temperature of 210° C. and a mold temperature of 40° C. A composite molded body was formed by insert molding. The composite molded body was punched with a JIS No. 3 dumbbell and then pulled at a cross head speed of 200 mm/min to measure fusion bonding strength and fusion bonding elongation.

The fusion bonding strength was evaluated in accordance with the following standard.

A: Fusion bonding strength was 3.5 MPa or more
B: Fusion bonding strength was 3.0 MPa or more and less than 3.5 MPa
C: Fusion bonding strength was less than 3.0 MPa Although fusion bonding capability was evaluated using an injection-molded sheet in the above-described evaluation, the fusion bonding capability of a composite molded body as illustrated in FIG. 1 which is formed of the thermoplastic elastomer composition can also be determined on the basis of the above evaluation results.

EXAMPLES AND COMPARATIVE EXAMPLES

Example 1

In a Henschel mixer, 100 parts by mass of (A1-1), 133 parts by mass of (B-1), 100 parts by mass of (C-1), 2.5 parts by mass of (D-1) (mixture of 40 parts by mass of 2,5-dimethyl-2,5-di(t-butylperoxy)hexane and 60 parts by mass of calcium carbonate), 2.5 parts by mass of (D-2) (mixture of 55 parts by mass of divinylbenzene and 45 parts by mass of ethyl vinyl benzene), 10 parts by mass of (E-1), and 0.3 parts by mass of (F-1) were mixed with one another for 1 minute to form a mixture. This mixture was charged into feed ports of a co-rotating twin-screw extruder ("TEX30a" produced by The Japan Steel Works, Ltd., L/D=46, number of cylinder blocks: 13) at a rate of 15 kg/h in total. The temperature was increased to 110° C. to 220° C. and melt-kneading was performed. Then, pellets were formed. Hereby, a thermoplastic elastomer composition was prepared.

The melt flow rate (MFR) of the thermoplastic elastomer composition was measured at a temperature of 230° C. and a load of 21.2 N by a method conforming to JIS K 7210. The density of the thermoplastic elastomer composition was measured in accordance with Method A of ISO 1183 (Immersion Method). The thermoplastic elastomer composition was evaluated in terms of the items (1) to (7) above. Table-1 lists the evaluation results.

Examples 2 to 10 and Comparative Examples 1 to 3

Pellets of a thermoplastic elastomer composition were prepared as in Example 1, except that the formulation of the thermoplastic elastomer composition was changed as described in Table-1. The thermoplastic elastomer composition was evaluated as in Example 1. Table-1 lists the results.

In Table 1, the content of the component (D-1) is not an actual content but is the content of only 2,5-dimethyl-2,5-di(t-butylperoxy)hexane included in the component (D-1) (40% of the actual content of the component (D-1)), and the content of the component (D-2) is also not an actual content but is the content of only divinylbenzene included in the component (D-2) (55% of the actual content of the component (D-2)).

In Table 1, the notations *1 to *3 mean the followings.
*1: The symbols "-" in the columns of components mean that the components were not used
*2: The content of only 2,5-dimethyl-2,5-di(t-butylperoxy)hexane included in the component (D-1)
*3: The content of only divinylbenzene included in the component (D-2)

TABLE 1

|  |  |  | Unit | Examples | | | | | | | | | | Comparative examples | | |
|---|---|---|---|---|---|---|---|---|---|---|---|---|---|---|---|---|
|  |  |  |  | 1 | 2 | 3 | 4 | 5 | 6 | 7 | 8 | 9 | 10 | 1 | 2 | 3 |
| Form- ulation *1 | Component (A) | A1-1 | Mass part | 100 | 100 | 100 | 50 | 50 | 50 | — | — | — | — | — | — | — |
|  |  | A1-2 | Mass part | — | — | — | — | — | — | 100 | 100 | 100 | 100 | — | — | — |
|  |  | A2-1 | Mass part | — | — | — | 50 | 50 | 50 | — | — | — | — | 100 | 100 | 100 |
|  | Component (B) | B-1 | Mass part | 133 | 133 | 133 | 133 | 133 | 133 | 133 | 133 | 133 | 133 | 133 | 133 | 133 |
|  | Component (C) | C-1 | Mass part | 100 | 100 | 100 | 100 | 100 | 100 | 100 | 100 | 100 | 100 | 100 | 100 | 100 |
|  | Component (D) | D-1*2 | Mass part | 1.0 | 0.8 | 0.5 | 1.0 | 0.8 | 0.5 | 0.8 | 0.8 | 0.8 | 0.8 | - | 0.1 | 0.5 |
|  |  | D-2*3 | Mass part | 1.4 | 1.1 | 0.6 | 1.4 | 1.1 | 0.6 | 1.1 | 0.9 | 0.7 | 0.6 | - | - | 0.6 |
|  | Component (E) | E-1 | Mass part | 10 | 10 | 10 | 10 | 10 | 10 | 10 | 10 | 10 | 10 | 10 | 10 | 10 |
|  | Component (F) | F-1 | Mass part | 0.3 | 0.3 | 0.3 | 0.3 | 0.3 | 0.3 | 0.3 | 0.3 | 0.3 | 0.3 | 0.3 | 0.3 | 0.3 |
| Evalu- ation results | MFR (230° C. × 21.2N) |  | g/10 min | 35 | 39 | 65 | 29 | 31 | 66 | 30 | 35 | 41 | 60 | 59 | 105 | 95 |
|  | Density (immersion method) |  | g/cm$^3$ | 0.90 | 0.90 | 0.90 | 0.90 | 0.90 | 0.90 | 0.90 | 0.90 | 0.90 | 0.90 | 0.90 | 0.90 | 0.90 |
|  | Hardness (Duro A) |  | — | 81 | 82 | 81 | 82 | 82 | 79 | 79 | 78 | 77 | 77 | 83 | 80 | 81 |
|  | Tensile stress at break |  | MPa | 8.6 | 10.0 | 10.4 | 9.2 | 9.7 | 11.0 | 13.0 | 13.2 | 12.7 | 13.8 | 12.2 | 10.1 | 9.8 |
|  | Elongation at break |  | % | 790 | 772 | 804 | 754 | 744 | 865 | 868 | 867 | 834 | 869 | 868 | 843 | 789 |
|  | Coefficient of kinetic friction |  | — | 0.79 | 1.00 | 1.00 | 0.95 | 1.00 | 1.01 | 1.89 | 1.98 | 2.14 | 2.08 | 0.91 | 1.02 | 1.05 |
|  | Coefficients of static friction |  | — | 1.28 | 1.54 | 1.53 | 1.50 | 1.53 | 1.61 | 1.23 | 1.13 | 1.30 | 1.38 | 1.60 | 1.70 | 1.71 |
|  |  |  | Grade | A | A | A | A | A | B | A | A | A | A | B | C | C |
|  | Fusion bonding strength to TPV |  | MPa | 3.6 | 3.5 | 3.7 | 3.7 | 3.6 | 3.3 | 3.1 | 3.1 | 3.1 | 3.1 | 3.2 | 3.3 | 3.3 |
|  |  |  | Grade | A | A | A | A | A | B | B | B | B | B | B | B | B |
|  | Fusion bonding elongation to TPV |  | % | 100 | 80 | 145 | 100 | 85 | 110 | 45 | 55 | 60 | 60 | 78 | 130 | 95 |
|  | Compression set (100° C. × 22 hr) |  | % | 72 | 73 | 77 | 73 | 71 | 76 | 71 | 72 | 72 | 74 | 84 | 86 | 85 |
|  |  |  | Grade | A | A | B | A | A | B | A | A | A | A | C | C | C |
|  | Compression set (70° C. × 22 hr) |  | % | 57 | 57 | 60 | 57 | 58 | 59 | 58 | 57 | 56 | 56 | 59 | 60 | 59 |

<Evaluation Results>

As described in Table-1, the thermoplastic elastomer compositions prepared in Examples 1 to 10 were evaluated as excellent in terms of "sliding performance (coefficient of static friction)", "capability of fusion bonding to extrusion-molded members", and "compression set at high temperatures (100° C.)". Furthermore, since the thermoplastic elastomer compositions prepared in Examples 1 to 10 have a low density, they are advantageous in terms of weight reduction. Moreover, as for moldability, a flowability of 10 to 80 g/10 min (230° C., 21N), which is adequate for injection molding, was achieved.

In Comparative examples 1 to 3, where the whole amount of the (A1-1) used in Example 1 was replaced with the (A2-1) and, in Comparative examples 1 and 2, the content of the component (D) was reduced, the thermoplastic elastomer compositions were evaluated as poor in terms of "sliding performance (coefficient of static friction)", "capability of fusion bonding to extrusion-molded members", and "compression set (setting resistance) at high temperatures".

INDUSTRIAL APPLICABILITY

The thermoplastic elastomer composition according to the present invention can be used in a variety of fields described below: automotive parts, such as a skin, weatherstripping, a headliner material, an interior sheet, a bumper molding, a side molding, an air spoiler, an air duct hose, and a sealant; civil engineering and construction material parts, such as a water stop, a joint sealer, a window frame, and a sealant; sporting goods, such as a golf grip and a tennis racket grip; industrial parts, such as a hose tube and a gasket; home appliance parts, such as a hose and a packing; medical parts, such as a medical container, a gasket, and a packing; food parts, such as a container and a packing; medical equipment parts; electric wires; sundries; and the like. Among these, the thermoplastic elastomer composition according to the present invention is suitably used particularly as an automotive sealant or a building material sealant and is suitably used as an automotive sealant and, specifically, an automotive glass run channel.

Although the present invention has been described in detail with reference to specific embodiments, it is apparent to a person skilled in the art that various alterations and modifications can be made therein without departing from the spirit and scope of the present invention.

The present application is based on Japanese Patent Application Nos. 2019-015860 filed on Jan. 31, 2019, and 2019-153972 filed on Aug. 26, 2019, which are incorporated herein by reference in their entirety.

REFERENCE SIGNS LIST 1A, 1B EXTRUSION-MOLDED MEMBER
2 JOINT MEMBER
3 COMPOSITE MOLDED BODY

The invention claimed is:

1. A joint member comprising a thermoplastic elastomer composition including components (A), (B), and (C) below, wherein an amount of the component (B) is 100 to 140 parts by mass and an amount of the component (C) is 60 to 140 parts by mass relative to 100 parts by mass of the component (A), wherein the thermoplastic elastomer composition is formed by performing crosslinking with a component (D), and wherein a compression set of the thermoplastic elastomer composition, the compression set being measured under conditions of 70° C., 22 hours, and 25% compression in accordance with JIS K 6262, is 60% or less, Component (A): a hydrogenated product of a block copolymer including at least two polymer blocks composed primarily of a vinyl aromatic compound and at least one polymer block including butadiene, wherein the hydrogenated product of the block copolymer comprises a hydrogenated product (A1) of a block copolymer having a weight-average molecular weight of 300,000 or more and a hydrogenated product (A2) of a block copolymer having a weight-average molecular weight of 220,000 to 290,000, Component (B): a hydrocarbon rubber softener,
Component (C): a polypropylene resin,
Component (D): a crosslinking agent
wherein a melt flow rate of the thermoplastic elastomer composition measured at a temperature of 230° C. and a load of 21.2 N in accordance with JIS K 7210 is 10 to 80 g/10 min.

2. The joint member according to claim 1, wherein the component (C) includes a propylene random copolymer having a melting peak temperature of 100° C. or more and less than 157° C.

3. The joint member according to claim 1, wherein a content of the component (D) in the thermoplastic elastomer composition is 0.5 parts by mass or more and 10.0 parts by mass or less relative to 100 parts by mass of the component (A).

4. An automotive composite molded body comprising the joint member claim 1.

5. A method for producing a joint member, the method comprising melt-kneading a thermoplastic elastomer composition including components (A), (B), (C), and (D) below, wherein an amount of the component (B) is 100 to 140 parts by mass and an amount of the component (C) is 60 to 140 parts by mass relative to 100 parts by mass of the component (A), and injection-molding the kneaded thermoplastic elastomer composition, Component (A): a hydrogenated product of a block copolymer including at least two polymer blocks composed primarily of a vinyl aromatic compound and at least one polymer block including butadiene, wherein the hydrogenated product of the block copolymer comprises a hydrogenated product (A1) of a block copolymer having a weight-average molecular weight of 300,000 or more and a hydrogenated product (A2) of a block copolymer having a weight-average molecular weight of 220,000 to 290,000, Component (B): a hydrocarbon rubber softener,
Component (C): a polypropylene resin,
Component (D): a crosslinking agent,
wherein a melt flow rate of the thermoplastic elastomer composition measured at a temperature of 230° C. and a load of 21.2 N in accordance with JIS K 7210 is 10 to 80 g/10 min.

6. A thermoplastic elastomer composition comprising components (A), (B), and (C) below, wherein an amount of the component (B) is 100 to 140 parts by mass and an amount of the component (C) is 60 to 140 parts by mass relative to 100 parts by mass of the component (A), wherein the thermoplastic elastomer composition is formed by performing crosslinking with a component (D), and wherein a compression set of the thermoplastic elastomer composition, the compression set being measured under conditions of 70° C., 22 hours, and 25% compression in accordance with JIS K 6262, is 60% or less, Component (A): a hydrogenated product of a block copolymer including at least two polymer blocks composed primarily of a vinyl aromatic compound and at least one polymer block including butadiene, wherein the hydrogenated product of the block copolymer comprises a hydrogenated product (A1) of a block copolymer having a weight-average molecular weight of 300,000 or more and a hydrogenated product (A2) of a block copolymer having a weight-average molecular weight of 220,000 to 290,000, Component (B): a hydrocarbon rubber softener,
Component (C): a polypropylene resin,
Component (D): a crosslinking agent,
wherein a melt flow rate of the thermoplastic elastomer composition measured at a temperature of 230° C. and a load of 21.2 N in accordance with JIS K 7210 is 10 to 80 g/10 min.

7. The thermoplastic elastomer composition according to claim 6, the thermoplastic elastomer composition having a density of 0.90 to 0.95 g/cm$^3$.

8. The joint member according to claim 1, wherein the hydrogenated product (A2) of the block copolymer has a weight-average molecular weight of 230,000 to 280,000.

9. The joint member according to claim 1, wherein the polypropylene resin comprises a propylene random copolymer including a propylene unit and a unit other than the polypropylene unit.

10. The joint member according to claim 9, wherein a content of the propylene unit in the propylene random copolymer is 60 to 99 wt %.

11. The joint member according to claim 9, wherein a content of the propylene unit in the propylene random copolymer is 80 to 98 wt %.

12. The joint member according to claim 1, wherein the crosslinking agent comprises an organic peroxide.

13. The joint member according to claim 1, wherein the crosslinking agent comprises a phenolic resin.

14. The joint member according to claim 1, wherein the crosslinking agent comprises 2,5-dimethyl-2,5-di(t-butylperoxy)hexane.

15. The joint member according to claim 1, wherein the crosslinking agent comprises divinylbenzene.

* * * * *